United States Patent Office 3,047,208
Patented July 31, 1962

3,047,208
DEVICE FOR IMPARTING MOVEMENT TO GASES
Henri Coanda, Paris, France, assignor to Sebac Nouvelle S.A., Lausanne, Switzerland, a corporation of Switzerland
Filed Apr. 30, 1957, Ser. No. 656,081
Claims priority, application France Sept. 13, 1956
2 Claims. (Cl. 230—95)

The present invention has for its object a static device, that is to say without any moving parts, enabling a mass of gas to be set into motion by means of another much smaller mass of a fluid possessing a large amount of energy.

It is known that in the usual types of gas turbine, or in turbo-jet units for aircraft, a cycle is employed in which a gas is successively compressed in a rotary compressor and is then expanded in a turbine, the internal energy of the gas being increased between the compressor and the turbine by means of a burner so as to recover in the turbine more energy than was expended in the compressor, this surplus of energy being the useful energy.

The applicant had also the idea of producing a cycle in which a gaseous fluid is subjected to two reverse operations, between which its energy is increased in order to collect a useful energy at the end of the operation.

In accordance with the invention, the fluid is first of all expanded and then it is compressed, and between these two operations, the internal energy of the fluid is increased, these three operations being carried out without the use of any moving part. More especially, the two phases or operations of expansion and compression take place inside a circular convergent-divergent nozzle of the Venturi type, the expansion taking place in the known manner in the convergent portion and the compression in the divergent portion, whilst the increase in energy takes place in the convergent portion (it is completed in any case at the neck of the Venturi) by providing an annular nozzle, also of convergent-divergent form, which discharges into the convergent of the circular nozzle, this annular nozzle being supplied with a fluid under pressure through a slot, one of the lips of the mouth of said slot being extended so as to form at least one of the walls of the annular convergent-divergent nozzle.

In other words, it can be seen that a device in accordance with the invention is based on the property of circular convergent-divergent nozzles of the Venturi type which produce (apart from the losses) the conversion of a portion of the potential energy (of the gas which passes through them) which exists at the intake of the convergent, into kinetic energy at the neck of the discharge nozzle (the speed of passage of the fluid being a maximum at the neck), and then conversely, the re-conversion of this increase in kinetic energy into an increase in potential energy in the divergent. There is thus again found the same potential energy and the same kinetic energy at the outlet of the divergent as at the intake of the convergent, it being understood that the inake and oulet cross-section are identical, and assuming that the losses are nil, which is not the case except in theory.

In order to obtain at the outlet of the divergent an additional energy which can be used in the form of kinetic energy and/or in the form of potential energy, it is necessary to add a fresh quantity of energy to the gas which circulates in the nozzle and, in accordance with one of the essential features of the invention, this addition is effected by the introduction into the convergent portion of the nozzle of a smal mass of fluid having a very high energy. More especially, this introduction is carried out by means of an annular nozzle also convergent-divergent, known as the primary nozzle, the divergent of which discharges into the convergent of the circular nozzle, known as the secondary nozzle, said annular nozzle being supplied by a slot through which is passed a fluid under pressure.

In an alternative form, the annular convergent-divergent nozzle may comprise only one single solid wall, the other wall being produced fictitiously by the mass of gaseous fluid which circulates in the convergent of the circular nozzle into which the annular nozzle discharges.

It is of course possible to arrange a number of annular nozzles so that they discharge into the convergent of one only or of a number of circular nozzles in order to produce a device in accordance with the invention.

In order that the invention may be better illustrated, it will now be described in connection with particular forms of embodiment thereof, reference being made to the accompanying diagrammatic drawings, it being well understood that these forms are given solely by way of examples and act in no way to limit the scope of the present invention.

Figure 1:
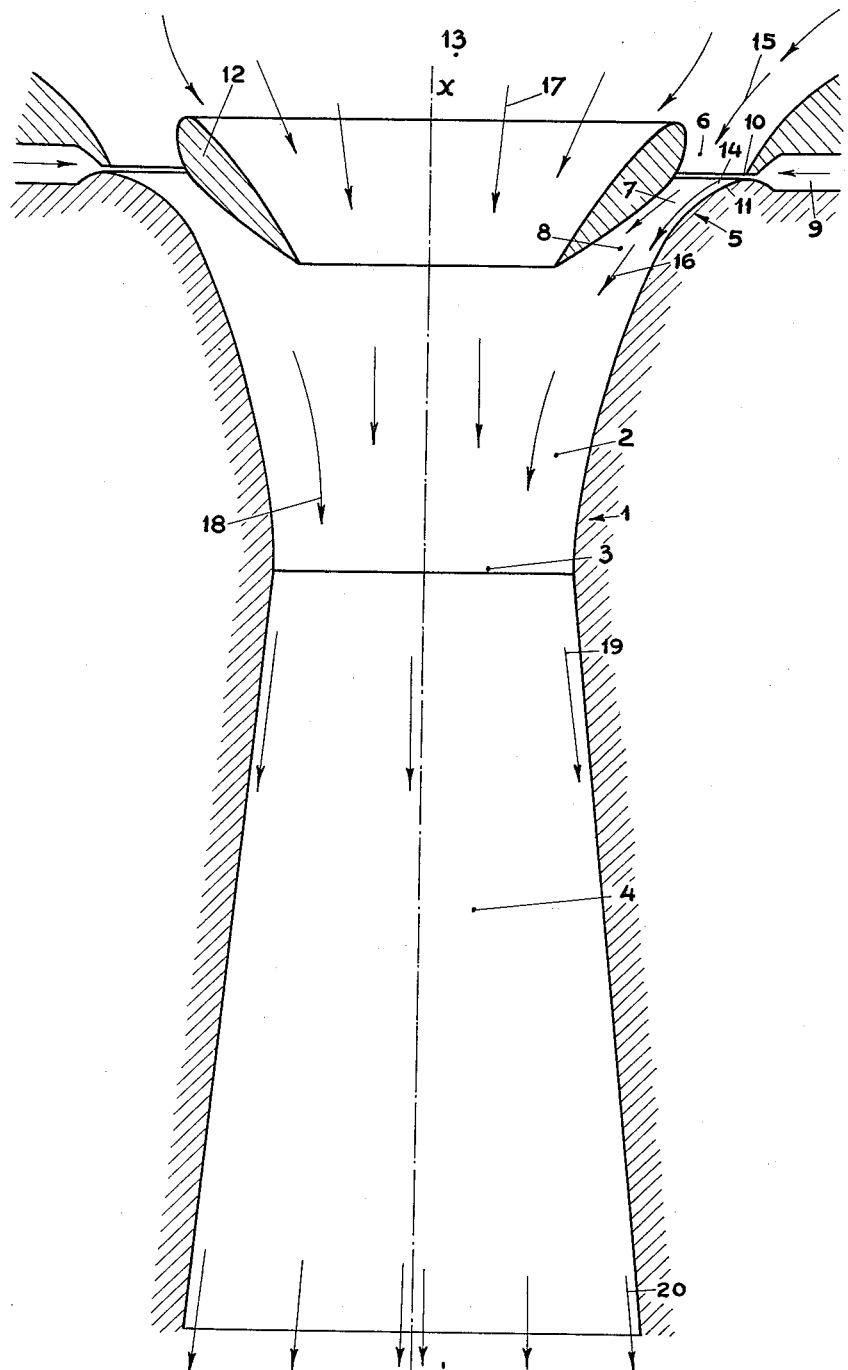
FIG. 1 shows in longitudinal cross-section a first form of embodiment of a device in accordance with the invention.

Referring first of all to FIG. 1, in which a first form of embodiment has been shown, it is seen that a static device in accordance with the invention (a body of revolution about the axis XX') comprises a circular convergent-divergent nozzle on Venturi 1 (being the secondary nozzle which comprises in the known manner a convergent 2, a neck or throat 3 and a divergent 4) and an annular nozzle 5 also convergent-divergent being the primary nozzle comprising a convergent 6, a neck 7 and a divergent 8), the divergent 8 of the nozzle 5 discharging into the convergent 2 of the nozzle 1.

The annular nozzle 5 is supplied with a fluid under pressure from a container or from a piping system 9 which is discharged through a slot 10. This is circular as shown or it may be formed only in one portion of the convergent 6 of the nozzle 5. One of the lips 11 of the mouth of the slot 10 is extended so as to form one of the walls of the convergent 6 of the annular nozzle 5, while the other wall of this convergent is formed (in the same way as one of the walls of the neck 7 and of the divergent 8 of this nozzle 5) by a hollow member 12 of revolution, carried by means (not shown) inside the discharge nozzle 1. The annular wall adjacent the slot in effect defines in a cross section of the primary nozzle a surface which forms in an extension of the lip of said slot on the side toward the outlet of said primary nozzle and which progressively recedes from the direction of emergence of said fluid under pressure from said slot.

The nozzle 1 is open at both its extremities: at the up stream extremity of the convergent 2, the ambient air 13 is set into motion by the fluid passing out of the slot 10. In FIG. 1, arrows 14 have been used to show the fluid passing out of the slot 10, while the arrows 15 represent the ambient air drawn in through the annular nozzle 5.

In addition, the mixture of the ambient air and the driving fluid passing out of the extremity of the divergent 8 of the nozzle 5, which mixture is represented by the arrows 16, carries along the ambient air in the direction of the arrows 17 across the central hollow portion of the member of revolution 12.

It should be noted that by construction and in accordance with one of the features of the invention, the fluid passing out of the slot 10 draws along in the direction of the arrows 15 a quantity of ambient air much less than the quantity of ambient air drawn in the direction of the arrows 17 by the mixture leaving the nozzle 5 in the direction of the arrows 16.

The mixture of three fluids (fluid passing out of the slot 10, air carried along the direction of the arrows 15, and air drawn along following the arrows 17) takes place in the convergent 2, and this mixture, represented by the arrows 18, reaches the throat 3 at which its kinetic energy is a maximum, in the divergent 4, the potential energy of the mixture increases by the transformation of a part of the kinetic energy into potential energy (the mixture is represented by the arrows 19 in the divergent 4).

Finally, the mixture leaves nozzle 1 in the direction of the arrows 20 with a momentum and in consequence a large useful thrust.

In actual fact, with a small mass of a fluid under pressure contained in the reservoir 9 or supplied through the piping system 9, a large mass of ambient air 13 has been carried along and a large thrust has been obtained, given that a large mass of fluid passes out in the direction of the arrows 20, having in consequence a large momentum.

Figure 2:
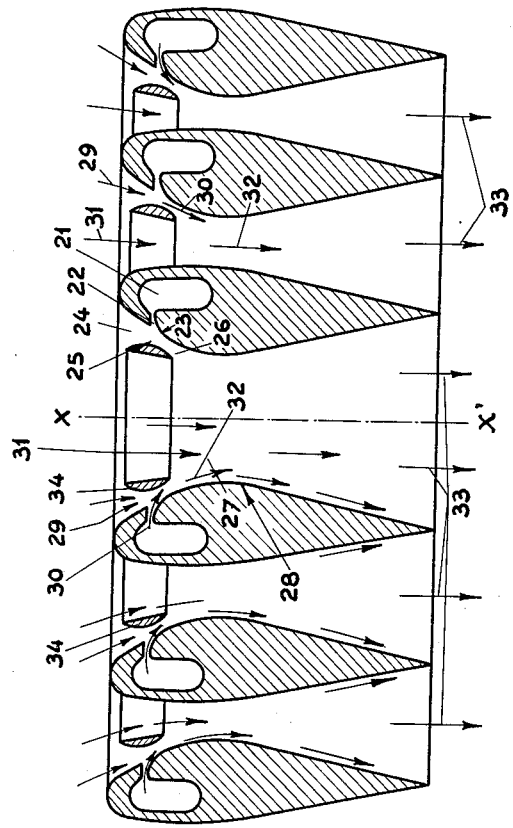
FIG. 2 shows, also in longitudinal cross-section, a second form of embodiment in which use has been made of a number of discharge-nozzles in order to produce a device in accordance with the invention.

In FIG. 2, there has been shown an assembly comprising three devices of the type shown in FIG. 1, arranged coaxially one inside the other around the axis of revolution X—X'.

In this form of embodiment, the driving fluid leaves under pressure containers 21 through a series of slots 22 of which one of the extended lips 23, as heretofore described, constitutes one of the walls of a convergent 24 of an annular convergent-divergent primary nozzle 25, the divergent 26 of which discharges into the convergent 27 of a secondary convergent-divergent nozzle 28.

The operation of the multiple set of nozzles of FIG. 2 is the same as that of the nozzles of FIG. 1. The fluid passing out under pressure through the slots 22 carries along a small quantity of ambient air in the direction of the arrows 29, and the mixture of the air 29 and the driving fluid discharged following the arrows 30 into the convergent portion 27 carries along a further quantity of ambient air in the direction of the arrows 31, the total mixture taking place in the convergent portion 27 of each nozzle 28 (arrows 32), and the final thrust being obtained at the outlet of the total mass of fluid following the arrows 33.

As in the case of the first form of embodiment, the internal walls of the primary nozzles 25 are constituted by hollow members of revolution 34.

This form of embodiment enables much flatter nozzles to be constructed, that is to say in the case in which the axis XX' is vertical, nozzles of small height, which nevertheless produce a large thrust.

Figure 3:
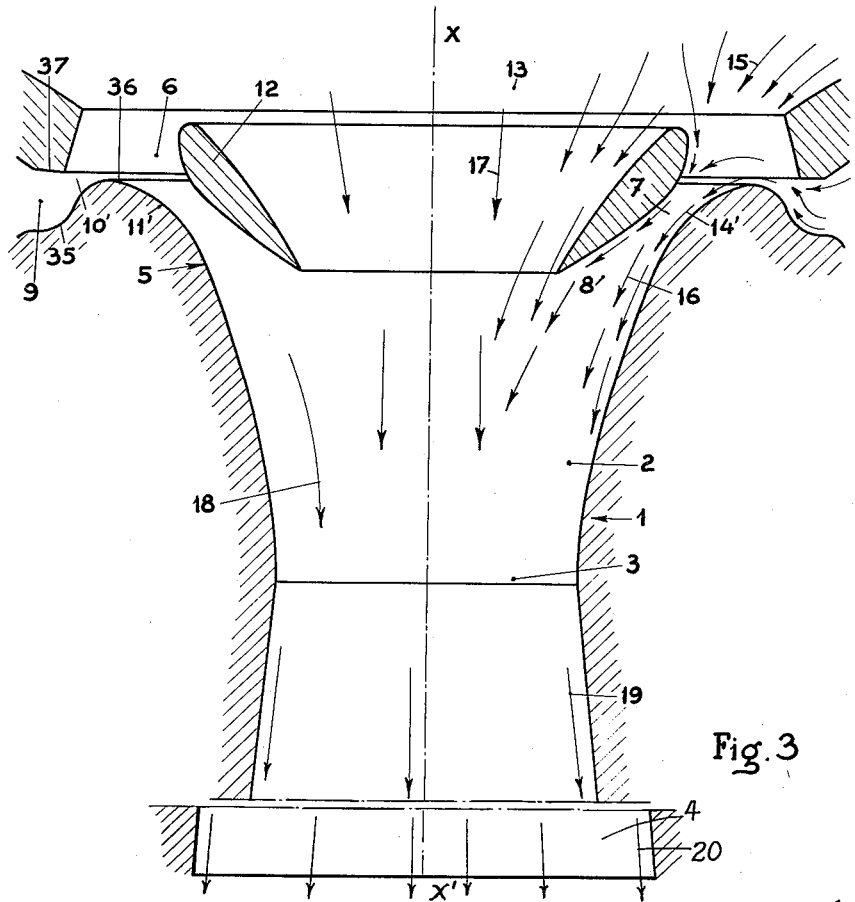
FIG. 3 shows an alternative form of the mode of embodiment of FIG. 1.

The form of embodiment shown in FIG. 3 is similar to that of FIG. 1, and for that reason the same reference numbers have been used to indicate the corresponding parts, and it has not been considered useful to describe the identical portions, in view of the description given with reference to FIG. 1, which is applicable to FIG. 3, being a body of revolution about the axis XX' the arrows showing the movements of the fluids have only been indicated on the right-hand portion of the drawing.

The single difference is constituted by the fact that the extended lip 11' of the slot 10', through which passes the driving fluid in the direction of the arrows 14', forms first of all an elbow 35 before turning round at 36 to form at 11' one of the walls of the convergent 6 of the nozzle 5, the other wall of this convergent being formed by the hollow member 12. The second lip 37 of the mouth of the slot 10' is advanced so as to form a kind of screen or baffle forcing the driving fluid to carry out a winding movement.

There is thus obtained a nozzle with reversed thrust between the walls 35, 36 and 11' on the one hand, and 37 and 12 on the other.

Due to the known operation of the Coanda effect, described for example in U.S. Patent No. 2,052,869, granted September 1, 1936, to Henri Coanda, the driving fluid discharged under pressure through the slot 10' will create a zone of reduced pressure in the immediate proximity of the curved extended lip 36 and starting approximately at the point marked 36. The driving fluid consequently tends to move into this zone and its direction of flow is along the wall 11' and into the throat and the divergent of the annular nozzle 5. This flow again creates a pressure drop at the convergent intake of the nozzle 5, and a movement of the ambient air is thus induced in the direction of the arrow 15, this movement becoming accelerated by the driving fluid at the convergent portion of the nozzle 5.

Figure 4:
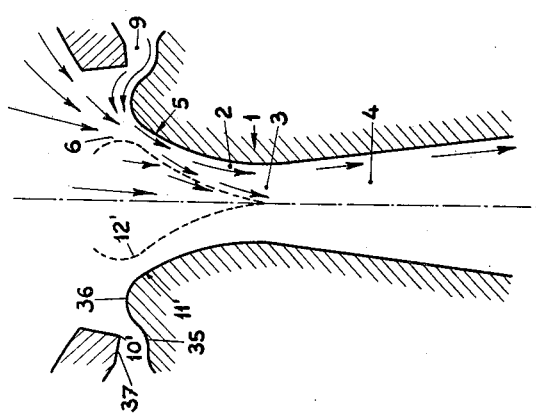
FIG. 4 is an alternative form of the embodiment shown in FIG. 3.

The form of embodiment of FIG. 4 is identical with the form of embodiment shown in FIG. 3, apart from the fact that the member 12 is dispensed with, the internal wall of the nozzle 5 being realized fictitiously by the ambient fluid which has been set in motion. This fictitious wall has been shown by broken lines 12'.

Figure 5:
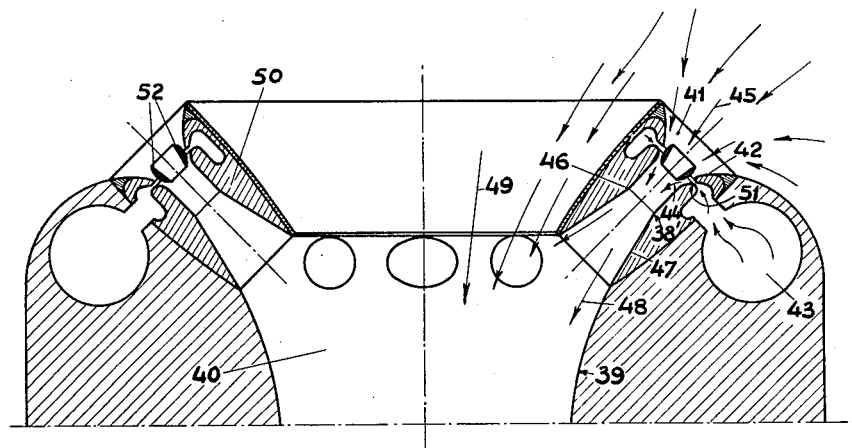
FIG. 5 shows in cross-section along the line V—V of FIG. 6, a form of embodiment in which a number of annular discharge nozzles discharge into a single circular nozzle.
Figure 6:
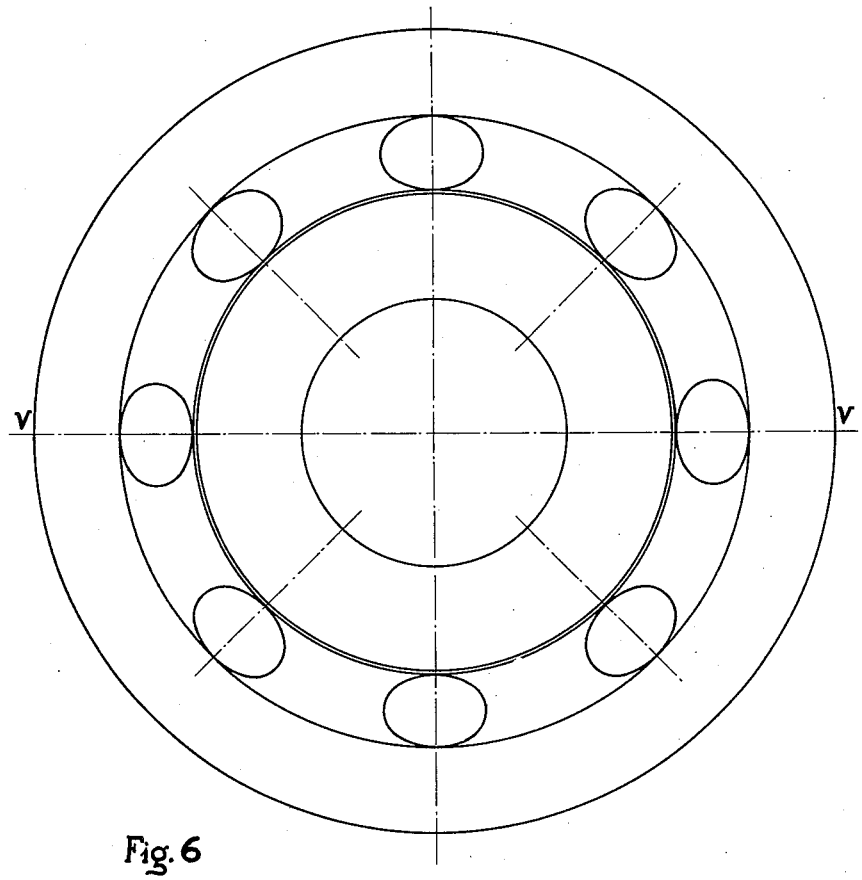
FIG. 6 is a plan view of the device shown in FIG. 5.

In FIGS. 5 and 6, there have been shown a form of embodiment in which a series of annular convergent-divergent primary nozzles 38 discharge into a secondary nozzle 39, also convergent divergent, only the convergent 40 of this nozzle being shown in FIG. 5 (the nozzle 39 is similar to the nozzle 1 of FIG. 1).

Each nozzle 38 comprises a convergent portion 41 into which discharges a slot 42 supplied with air under pressure from a chamber 43. The convergent 41 is formed on the one hand by the extended lip 51 of the slot 42 and on the other hand by the hollow member 52.

The fluid under pressure passes out of the slot 42 in the direction of the arrows 44, and it carries with it the ambient air in the direction of the arrows 45. The mixture of the air 45 and the fluid 44 passes to the neck 46 and then into the divergent 47 of each nozzle 38 to pass out following the arrows 48 and carrying along the ambient air in the direction of the arrows 49 through the interior of the hollow member 50.

As in the case of the form of embodiment of FIG. 1, the mixture of the three fluids (the fluid passing out through the slot 42 in the direction of the arrows 44, the fluid 41 and the fluid 49) passes through the convergent portion of the nozzle 39, and then through the neck and the divergent (not shown) of this nozzle, before being discharged to produce the desired thrust.

It will of course be understood that modifications may be made to the form of embodiment shown and described, and that elements may be replaced by equivalent elements, without thereby departing from the spirit and from the scope of the appended claims.

Figure 7:
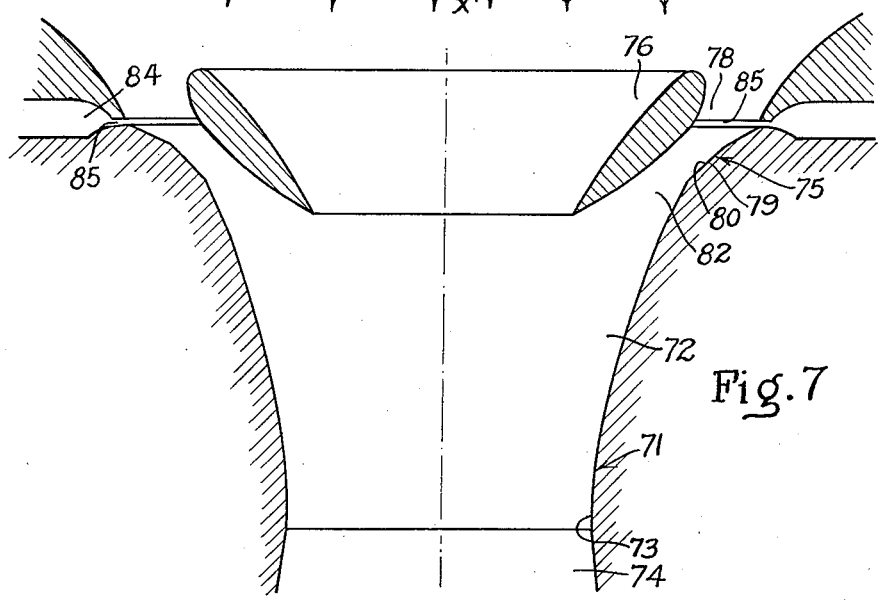
FIG. 7 is a fragmentary longitudinal view of a modified embodiment of a device of the type shown in FIG. 1.

For example, the extended lip of the mouth of the slot through which the driving fluid is supplied may be formed by facets instead of being constituted by a continuous curve. An embodiment of the invention having this feature is illustrated in FIG. 7. The device illustrated has a circular convergent-divergent nozzle or venturi 71 comprising a convergent portion 72, a throat 73 joining the convergent portion to a divergent portion 74.

This venturi forms the secondary nozzle of the device. A primary annular nozzle 75 is formed by an annular member 76, in conjuntcion with the mouth of the aforementioned convergent nozzle in which it is disposed coaxial therewith. This primary nozzle has a converging portion 78 and a throat 79 formed by a facet 80 and the annular member. A divergent portion 82 of the primary nozzle opens into the converging portion 72 of the secondary nozzle. Driving fluid under pressure is provided from a source, not shown, through conduit means 84 to a circular slot 85. This device functions in the manner of the device illustrated in FIG. 1 to impart movement to the ambient fluid as heretofore described.

What I claim is:

1. A device for imparting a high velocity of flow to a compressible fluid by means of a relatively small flow of an auxiliary compressible fluid, said device comprising a secondary convergent-divergent nozzle providing a main fluid path for a compressible ambient fluid to which rapid flow is to be imparted, said secondary nozzle having an annular wall defining a convergent inlet and a divergent outlet and a circular throat coupling together said inlet and outlet, annular means coaxial with said secondary nozzle defining in conjunction with said convergent inlet of the secondary nozzle at least one annular primary nozzle in the inlet of said secondary nozzle and having a convergent inlet and a divergent outlet disposed for delivering said compressible ambient fluid into and within the inlet of said secondary nozzle, said annular wall of said secondary nozzle having an annular Coanda slot extending around said annular means and spaced radially outwardly therefrom, said slot having spaced lips, a chamber communicating with said slot and adapted to receive an auxiliary gaseous fluid under pressure which is discharged as a high-speed jet through said Coanda slot into said convergent inlet of said primary nozzle, said wall having an annular portion defining in a cross-section of said primary nozzle a surface forming an extension of the lip of said slot on the side toward the outlet of said primary nozzle and which progressively recedes from the direction of emergence of said pressure fluid through said slot so that a stream of fluid discharged through said slot tends to follow said surface and to induce adjacent ambient fluid in said primary and secondary nozzles to join in the stream, and said stream of pressure fluid and ambient fluid flowing outwardly through said divergent outlet of said secondary nozzle.

2. A device for imparting a high velocity of flow to a compressible fluid by means of a relatively small flow of an auxiliary compressible fluid, said device comprising a secondary convergent-divergent nozzle providing a main fluid path for a compressible ambient fluid to which rapid flow is to be imparted, said secondary nozzle having an annular wall defining a convergent inlet and a divergent outlet and a circular throat coupling together said inlet and outlet, an annular body of substantially conical section coaxial with said secondary nozzle defining in conjunction with said convergent inlet of the secondary nozzle at least one annular primary nozzle of convergent-divergent section having a convergent inlet and a divergent outlet, the divergent outlet of said primary nozzle being disposed for delivering said compressible ambient fluid into and within the inlet of said secondary nozzle, said secondary nozzle having an annular Coanda slot formed in said annular wall of said secondary nozzle extending circumferentially around said annular body and spaced radially outwardly therefrom, said slot having spaced lips, a chamber communicating with said slot and adapted to receive an auxiilary gaseous fluid under pressure which is discharged as a high-speed jet through said Coanda slot into said convergent inlet of said primary nozzle, said wall having an annular portion defining in a cross-section of said primary nozzle a surface forming an extension of the lip of said slot on the side toward the outlet of said primary nozzle and which progressively recedes from the direction of emergence of said pressure fluid through said slot so that a stream of fluid discharged through said slot tends to follow said surface and to induce adjacent ambient fluid in said primary and secondary nozzles to join in the stream, and said stream of pressure fluid and ambient fluid flowing outwardly through said divergent outlet of said secondary nozzle.

References Cited in the file of this patent

UNITED STATES PATENTS

| | | |
|---|---|---|
| 277,072 | Sherriff | May 8, 1883 |
| 302,182 | Zotoff | July 15, 1884 |
| 1,228,608 | Scanes | June 5, 1917 |
| 1,506,908 | Kirgan | Sept. 2, 1924 |
| 1,543,834 | Ehrhart | June 30, 1925 |
| 1,574,677 | Mulder et al. | Feb. 23, 1926 |
| 2,000,741 | Buckland | May 7, 1935 |
| 2,906,089 | Kadosch et al. | Sept. 29, 1959 |

FOREIGN PATENTS

| | | |
|---|---|---|
| 200,437 | Switzerland | Dec. 16, 1938 |
| 382,965 | Germany | Oct. 17, 1923 |
| 517,405 | France | June 18, 1920 |